(12) United States Patent  (10) Patent No.: US 7,713,572 B2
Haschen et al.  (45) Date of Patent: May 11, 2010

(54) FERMENTATION BYPRODUCT FEED FORMULATION AND PROCESSING

(76) Inventors: Thomas L. Haschen, 303 S. Harrison St., Easton, MD (US) 21601; Robert J. Patterson, RR3, 14208 Dublin Lane, Acton, Ontario (CA) L7J 2L9

( * ) Notice: Subject to any disclaimer, the term of this patent is extended or adjusted under 35 U.S.C. 154(b) by 640 days.

(21) Appl. No.: 10/530,290

(22) PCT Filed: Sep. 11, 2003

(86) PCT No.: PCT/US03/28376

§ 371 (c)(1), (2), (4) Date: Jun. 14, 2005

(87) PCT Pub. No.: WO2005/034644

PCT Pub. Date: Apr. 21, 2005

(65) Prior Publication Data

US 2005/0255220 A1 Nov. 17, 2005

(51) Int. Cl.
*A23K 1/06* (2006.01)
(52) U.S. Cl. ............... 426/624; 426/630; 426/635; 426/807; 426/2; 426/74
(58) Field of Classification Search ........... 426/624, 426/630, 635, 807, 2, 74; 99/483, 485
See application file for complete search history.

(56) References Cited

U.S. PATENT DOCUMENTS

| | | | |
|---|---|---|---|
| 3,873,728 A | 3/1975 | Moore | |
| 3,875,304 A | 4/1975 | Hunt et al. | |
| 4,109,019 A | 8/1978 | Moore | |
| 4,664,905 A * | 5/1987 | Meyer | 426/2 |
| 4,704,287 A | 11/1987 | Meyer | |
| 4,859,485 A | 8/1989 | Linton et al. | |
| 5,158,791 A | 10/1992 | Nocek et al. | |
| 5,173,430 A | 12/1992 | Edwards et al. | |
| 5,219,596 A * | 6/1993 | Smith et al. | 426/2 |
| 5,225,228 A * | 7/1993 | Reddy et al. | 426/618 |
| 5,596,815 A | 1/1997 | Rice et al. | |
| 5,709,894 A * | 1/1998 | Julien | 426/53 |
| 5,824,355 A * | 10/1998 | Heitritter et al. | 426/459 |
| 5,976,594 A | 11/1999 | LaFollette | |
| 6,312,710 B1 * | 11/2001 | Julien | 424/438 |
| 6,537,604 B1 * | 3/2003 | Ethington, Jr. | 426/634 |
| 6,726,941 B2 * | 4/2004 | Ethington et al. | 426/2 |

FOREIGN PATENT DOCUMENTS

| | | |
|---|---|---|
| DE | 3904962 A1 | 8/1990 |
| FR | 2 390 109 A | 12/1978 |
| FR | 2 405 028 A | 5/1979 |
| JP | 59-095850 A | 6/1984 |
| WO | WO 9849903 A1 * | 11/1998 |
| WO | WO-02/37980 A2 | 5/2002 |

OTHER PUBLICATIONS

National Research Councol, Nutrient Requirements of Dairy Cattle 6th Revised Edition. National Academy Press, 1989. pp. 90-109.*
ConsumerReports.org. http://www.consumerreports.org/cro/food/animal-feed-and-the-food-supply-105/overview/index.htm. Jan. 2005. pp. 1-3.*
Schingoethe, David. Feeding Wet Distillers Grains to Dairy Cattle. Dairy Science Department, South Dakota State University. Presented May 23-24, 2001 at the Distillers Grains Technology Council 5th Annual Symposium Louisville, KY. pp. 1-8.*

* cited by examiner

*Primary Examiner*—Keith D. Hendricks
*Assistant Examiner*—Kelly Bekker
(74) *Attorney, Agent, or Firm*—Birch, Stewart, Kolasch & Birch, LLP (57) ABSTRACT

The invention is to products for enhancing the nutrient value of distillers, brewers or fermenters grain byproducts using an injector or mixer to add predetermined amounts of nutrients to the grains. The byproduct nutrient obtained is heated, dried and/or extruded to increase the ruminant bypass protein of the nutrient product.

38 Claims, 3 Drawing Sheets

FERMENTATION BYPRODUCT FEED FORMULATION AND PROCESSING

BACKGROUND OF THE INVENTION

1. Field of Invention

This invention concerns the formulation and processing of fermentation byproducts into useful feed products.

2. Description of Related Art

In the animal agricultural industry, a great deal of effort has been placed into providing nutritional high quality feed materials. Fermentation byproducts have been fed to domestic animals for hundreds of years in both in wet and dried form. Fermentation processes tend to concentrate nutrients in the by-products, such as, for example, corn, wheat, and/or barley, by using up the fermentable carbohydrates. Some vitamins and other nutrients are increased by the (yeast) fermentation process. For example, corn, which contains about 8% crude protein, is increased to a protein level of about 22% to 28%, on a 12% to 13% moisture level. Fat and fiber in spent corn are also typically increased to at least double their original levels through concentration.

Corn is a good candidate for fermentation due to its relatively high carbohydrate content. However, the low protein content of the grain in general, and its low content of the amino acid lysine, leads to low levels of these nutrients in the spent grain.

The spent grain has traditionally been sold to the animal feed industry as a product known as "distillers dried grain w/sol(DDGS)", "distillers dried grains (DDG)," and "wet distillers grains (WDG)," or "wet brewers grain (WBG)," and "dried brewers grain (DBG)." With much of the carbohydrate used up in the fermentation process and the relatively low levels of protein and energy, fermented grain has been of little interest to the poultry and swine industries. As a result, the majority of the fermentation byproducts from distillers and brewers, e.g., fermented grains, have been used as feeds for ruminants, including dairy cows.

In today's modern dairy operations ruminant animal rations are formulated with different ingredients to provide precise levels of degradable protein to the ruminant animal rumen bacteria and rumen undegradable protein (RUP) (also referred to as UIP or undegradable intake protein) in the ruminant animals' lower gastrointestinal tracts. Animal rations are also balanced to provide known levels of specific amino acids to the animals' lower gastrointestinal tracts.

SUMMARY OF THE INVENTION

The systems and methods according to this invention use grain fermentation byproducts in general and, in one exemplary embodiment, distilling industry byproducts, as base ingredients in the production of an animal feed or an animal feed supplement to improve the value of the distillers, fermenters and brewers by-products.

The systems and methods according to this invention allow a user, such as, for example, a brewer, fermenter and/or distiller, to use existing equipment with very little additional capital investment and achieve a high nutrient value ruminant animal feed and/or feed supplement compatible with today's sophisticated ration balancing programs.

The systems and methods according to this invention permit a user to realize improved drying efficiency of by-products by the use of other grain, grain byproduct or nutrient additives that have a lower moisture level than the wet distillers and/or brewers byproducts and can absorb moisture so that less moisture needs to be removed to achieve an end product with a moisture level of, for example, from about 0% to about 14%.

The systems and methods of this invention dry the resultant product/mixture at a dryer temperature of from between about 200° F. to about 1000° F. until the moisture level in the mixture is between about 0% to 14% by weight, and the temperature of the mixture at the end of drying is between about 180° F. to about 250° F.

The systems and methods of this invention cool the resultant product/mixture, including, for example, by ambient air cooling, to a temperature of about 200° F. or below, if desired.

The systems and methods according to this invention allow any brewer, distiller or fermenter to increase the nutrient value of their byproducts in a predictable manner.

In one exemplary embodiment of the systems and methods of this invention, a user can increase the nutrient value of byproducts by injecting specific nutrient sources into the wet end of the processes and after fermentation and/or distillation procedures.

The systems and methods according to this invention permit users to produce a large variety of nutritional supplements depending on the purchaser's specifications. Sophisticated nutritional and economic demands of the animal agricultural industry are achieved in a predictable manner using the systems, methods and resultant products according to this invention.

According to the systems and methods of this invention, the specific nutrient sources injected into/added to the wet end of the process can be used to determine to which animal species the upgraded product will be fed.

The nutritionally enhanced mixture produced according to the systems, methods and resultant products according to this invention may be fed wet or dry to animals. The form that the product takes for feeding can vary depending on the target animal species, nutrient specifications desired, nutrient density and the shipping distances involved.

The systems and methods according to this invention alter configuration of proteins in the mixture of wet distillers, brewers or fermenters grains and added nutrients using heat from drying and/or extruding the mixture, including mixtures usable as protein supplements produced for ruminant feeds including the dairy and/or beef industries. The heating which affects the RUP/UIP, where UIP is used to represent undegraded intake protein, and RUP is used to represent rumen undegraded protein, is performed after the nutrients are added to the wet distiller's, brewers or fermenters grains and/or during mixing of the wet distiller's grains, brewer's grains, fermenter's grains, with nutrients.

In various exemplary embodiments, the systems and methods according to this invention use equipment such as dryers and extruders that are already in place and conventionally used to produce the non-nutritionally enhanced fermentation byproducts.

In various exemplary embodiments, the systems and methods according to this invention mix nutrients with distillers, brewers or fermenters byproducts prior to final processing of those byproducts.

In various exemplary embodiments, the systems and methods according to this invention produce a nutritionally enhanced distiller's, brewer's or fermenter's grain byproduct that may be used by feed managers to produce a complete feed.

Certain exemplary embodiments of the systems and methods according to this invention also add minerals, energy sources, other protein, vitamins and other nutrients to feed materials to meet customer demands.

The systems and methods according to this invention permit a distiller, brewer or fermenter for example, to predict, and achieve predicted, nutrient values of a dried end product, including a particular bypass protein (RUP/UIP) level and amino acid content.

The systems and methods according to this invention permit a distiller, brewer or fermenter for example, to predict the digestible bypass protein (RUP/UIP) and digestible amino acids delivered to a ruminant's lower gastrointestinal tract, and the nutrient values of a dried end product, including a particular bypass protein (RUP/UIP) level and amino acid content.

The systems and methods according to this invention alter the drying time and/or amount of heat applied to mixtures of wet distiller's, brewer's or fermenter's grain byproducts and nutrients in terms of time of the byproducts and nutrients exposed to heat and maximum temperatures, which are within predetermined amounts, to predictably control, and achieve a desired, RUP/UP protein content of the nutritionally enhanced byproducts.

The methods according to this invention will produce an improved distillers, brewers or fermenters grain by-product by establishing desired nutritional values for the product to be produced, including a desired ruminant animal bypass protein range and amino acid levels. The enhanced product is produced by determining nutrients and nutrient amounts to be added to the by-product to achieve the targeted nutritional values, including bypass protein and amino acid levels, of the nutritionally enhanced distillers, brewer or fermenter grain by-product after processing. The determined amounts of nutrients are mixed with wet distillers, brewers or fermenters grains. The mixture of wet distillers, brewers or fermenters grains and nutrients is dried at a dryer temperature or temperatures between from about 200° F. to about 1,000° F. until the moisture level in the mixture is between from about 0% to about 14%, the mixture is in a temperature range of from about 180° F. to about 250° F., and the heat has increased the bypass protein level of the mixture to be within the desired ruminant animal bypass protein range.

The systems according to this invention produce an improved distillers, brewers or fermenters grain by-product by establishing desired nutritional values for the product to be produced, including a desired ruminant animal bypass protein range and amino acid levels. The enhanced product is produced by determining nutrients and nutrient amounts to be added to the by-product to achieve the targeted nutritional values, including bypass protein and amino acid levels, of the nutritionally enhanced distillers, brewer or fermenter grain by-product after processing. According to the systems and methods of this invention, the determined amounts of nutrients are mixed with wet distillers, brewers or fermenters grains. According to the systems and methods of this invention, the mixture of wet distillers, brewers or fermenters grains and nutrients is dried at a dryer temperature or temperatures between from about 200° F. to about 1000° F. until the moisture level in the mixture is between from about 0% to about 14%, the mixture is in a temperature range of from about 180° F. to about 250° F., and the heat has increased the bypass protein level of the mixture to be within the desired ruminant animal bypass protein range.

DETAILED DESCRIPTION OF PREFERRED EMBODIMENTS

Figure 1:
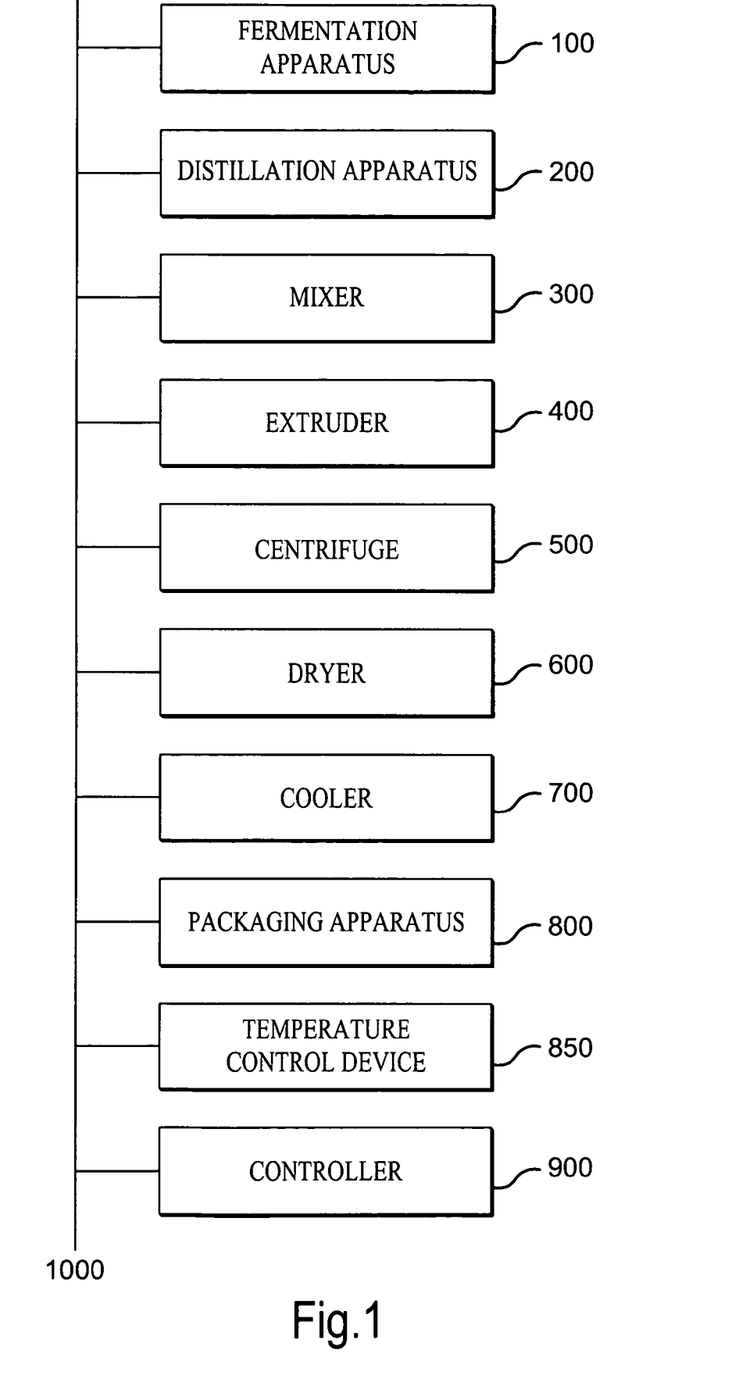
FIG. 1 is a highly schematic diagram of one exemplary embodiment of a system according to the invention.

FIG. 1 shows one exemplary embodiment of a system of this invention, which includes typical fermentation/distillation processing equipment, such as, for example, one or more fermentation apparatus(es) (100), one or more distillation apparatus(es)(200), mixer(s)(300), extruder(s) (400), centrifuge(s) (500), dryer(s) (600), cooler(s), including air coolers, (700), packaging or containerizing apparatus (800), and temperature control device(s) (850) that may optionally be applied to any or all of the aforementioned devices 100 through 850. These devices are connected via suitable means, such as, for example, electrical, electronic, mechanical and electromechanical devices and/or system. It should be understood that the systems, methods and resultant products according to this invention can use existing fermentation and distillation byproduct generation facilities and equipment, and/or new facilities and equipment. Moreover, one or more or all of the elements of the system may be controlled manually and/or by suitable electronic processing control equipment and/or software including, for example, controller 900. Controller 900 may employ hardware and/or software control elements. Elements 100 through 900 may be interconnected via interconnection means and/or bus 1000.

Figure 2:
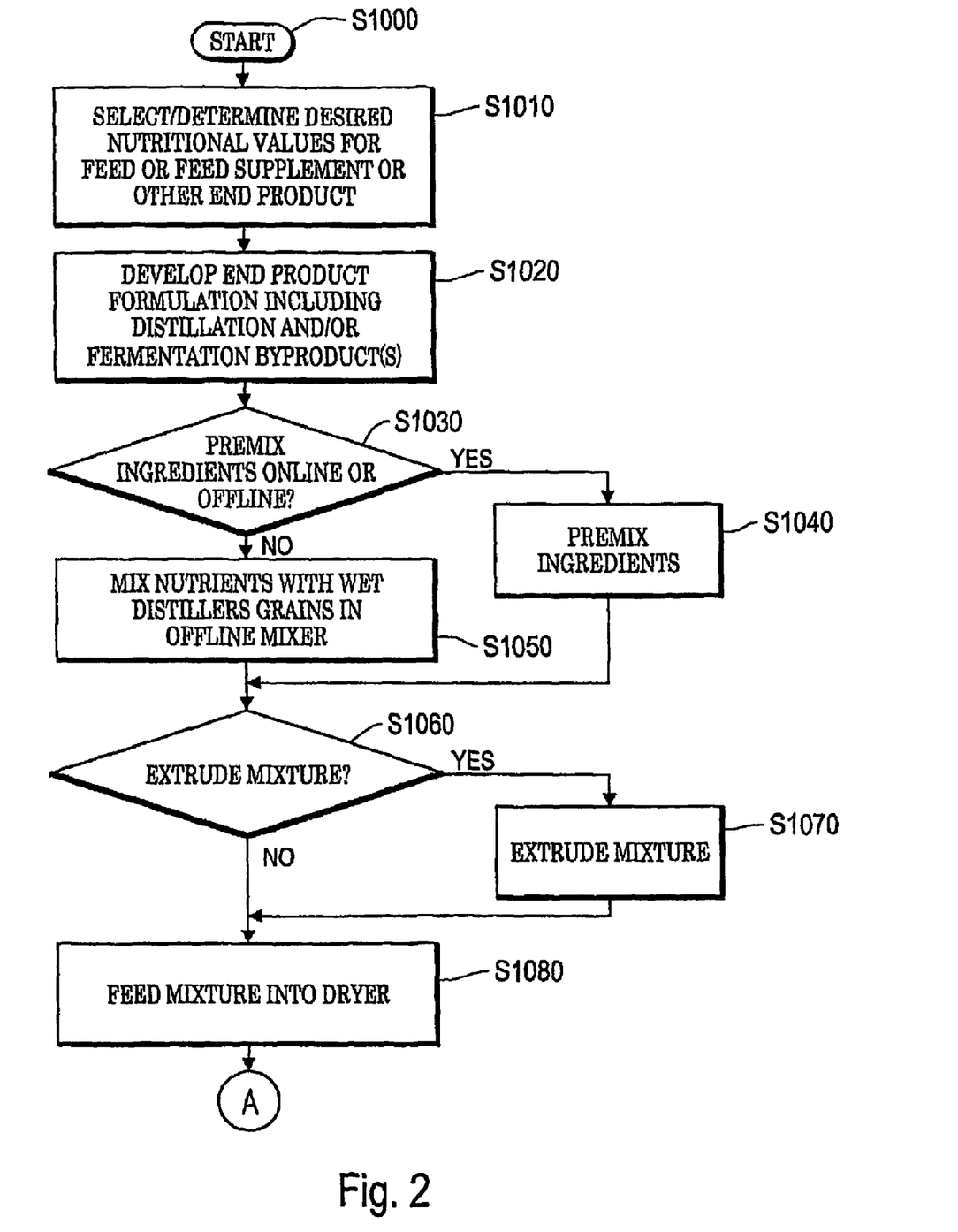
FIGS. 2 and 3 display a flowchart of one exemplary embodiment of a method according to the invention.

FIG. 2 shows one exemplary embodiment of the methods according to this invention for producing a nutritionally enhanced fermentation byproduct to achieve a nutritionally enhanced feed and/or feed supplement. The method commences in step S1000. Control then proceeds to step S1010, where desired nutritional values for an end product such as, for example, a mixture of wet distiller's, brewers or fermenters grain byproducts and nutrients are selected or determined. The desired nutritional values can be obtained, for example, from published data or, for example, determined on a case-by-case basis based on an analysis of nutrient deficiencies in animals to which the feed and/or feed supplement is to be fed or, for example from product specifications supplied by a customer. In one exemplary embodiment of the methods according to this invention, for simplicity, only two ingredients, e.g., wet corn distillers grains with solubles and 48% soybean meal, are used. In this exemplary embodiment of the systems and methods according to the invention, the nutrient formulas for two products of differing protein contents are established and the ingredients are processed after being mixed in the wet stage. Table 1 shows nutrient values for a high quality corn distillers grain with solubles. This particular product has a crude protein (CP) value of 30.3% on a dry matter (DM) basis and an undegradable protein (RUP/UP) value of 45.6% of the crude protein (CP). It has a lysine level of 2.13% and methionine value of 2.07% expressed as a % of the undegradable protein (RUP/UIP). These values, particularly protein, will vary between distillery sources and will also vary, even more so, when other grains such as barley or wheat are used in the distillation process.

The second ingredient in Table 1 is high protein soybean meal. This feedstuff is widely available to the animal agricultural industry as a dry product with about 8 to 12% moisture content The values for crude protein, RUP/UIP and methionine and lysine are typical values used by the animal agricultural industry. The soybean meal has a high protein level, 54% of DM, but has a low RUP/UIP of only 31.4% of the protein. It also has a relatively poor amino acid profile with a deficiency of methionine as compared to lysine.

TABLE 1

Values of Raw Materials

| Ingredient | % DM | % CP of DM | % UIP of CP | % Methionine of UIP | % Lysine of UIP | % UIP Methionine of DM | % UIP Lysine of DM |
|---|---|---|---|---|---|---|---|
| Corn Dist Grains w/sol Wet | 33.0 | 30.3 | 45.6 | 2.07 | 2.13 | 0.286 | 0.294 |
| High Protein Soybean Meal | 88.0 | 54.0 | 31.4 | 0.83 | 6.08 | 0.141 | 1.031 |

One may obtain a complete nutrient analysis of ingredients to be used in the formulation. If precise and repeatable results in the final product are not a high priority, standard values, such as those found in the National Research Council (NRC) reference, i.e., "Nutrient Requirements of Dairy Cattle, Seventh Revised Edition, published by the Committee on Animal Nutrition, National Research Council, 381 pages, 2001, may be used.

Next, control proceeds to step S1020, where an end product target nutritional formulation is developed using existing computer programs and nutritional values for distiller's wet by products and other ingredients.

The methods according to this invention allow the user to accurately produce a highly sophisticated protein supplement for ruminant animals. Selection of the types of ingredients, ratios of the ingredients and control of the processing allows the user to accurately predict and manipulate the following nutrient parameters for the end product:

1. The amount of rumen degradable protein in the wet mixture that will be converted to bypass protein (RUP/UIP) during processing.
2. Levels of both rumen degradable and rumen undegradable protein in the end product.
3. Levels of amino acids in the rumen undegradable protein and rumen degradable protein of the end product.
4. Ratios of amino acids in the rumen undegradable protein (RUP/UIP) in the end product.
5. Ratios of amino acids in the rumen degradable protein of the end product.
6. Post rumen digestibility of the rumen undegradable protein (RUP/UIP).
7. Fat levels in the end product.
8. Fiber levels in the end product.
9. Mineral levels in the end product.
10. Vitamin levels in the end product.
11. pH of the end product.
12. Moisture levels of the end product.

The systems and methods of this invention permit adjustment of absolute values of nutrient parameters 1 through 6 in a predictable manner. Absolute values of nutrient parameters 7-11 may be adjusted using conventional systems and methods, usually at the wet end of the feed formulation process, and nutrient parameter 12, i.e., product moisture levels may be adjusted using conventional systems and methods, usually downstream of the wet end of the feed formulation process. The systems and methods of this invention also permit predictable adjustment of values of nutrient parameters 1-6 relative to each other and relative to nutrient parameters 7-12.

According to the methods of the invention, the desired nutrient target(s) for the end product are selected on a finished dry product basis, i.e. a product with about 0-about 14% moisture. This can be done in consultation with customers and nutritionists to identify the needs of the target animals in a supplement and/or needed for a complete feed. There are very sophisticated nutritional models, such as, for example, the CPM-Dairy program, which is a well known dairy ration evaluation and formulation computer program, and excellent reference materials, such as the aforementioned NRC publication, known and available to those skilled in the art to facilitate the determination of nutrient specifications.

For this exemplary embodiment, the following table, Table 2, provides the target nutrient specifications for the two products that will be produced.

TABLE 2

End Product Nutrient Targets

| Product | % DM | % CP of DM | % UIP of CP | % Methionine of UIP | % Lysine of UIP | % UIP Methionine of DM | % UIP Lysine of DM |
|---|---|---|---|---|---|---|---|
| 40% Protein | 88.0 | 45.45 | 75.0 | 1.60 | 4.8 | 0.545 | 1.636 |
| 38% Protein | 88.0 | 43.18 | 75.0 | 1.70 | 4.5 | 0.551 | 1.457 |

Referring again to FIG. 2, control then moves to step S1020 where a (wet basis) formula is determined to deliver the desired end results, i.e., a product with the desired nutritional values. With knowledge of the composition of the wet material, i.e. brewers, fermenters or distillers wet grains, a formula is determined to deliver the desired nutrients when the product has been processed. One method of formula determination involves converting the wet spent grain data to a dry matter basis and then proportioning it with similar dry matter data on the other ingredients in the mixture. This results in a formulation on a dry matter basis, which may be converted to wet weights for the purpose of weighing and mixing.

The following two tables (Tables 3 and 4) provide wet basis formulas to produce 2000 pounds (1 ton) of a finished product on a dry matter basis.

TABLE 3

Formula-40% Protein Product

| Ingredient | Dry Matter Weight LBS | Wet weight LBS |
|---|---|---|
| Corn Dist Grains w/sol Wet | 721.5 | 2186.4 |
| High Protein Soybean Meal | 1278.5 | 1452.8 |

TABLE 4

Formula-38% Protein Product

| Ingredient | Dry Matter Weight LBS | Wet weight LBS |
|---|---|---|
| Corn Dist Grains w/sol Wet | 913.1 | 2767.0 |
| High Protein Soybean Meal | 1086.9 | 1235.1 |

Use of the above formulas will result in the following nutritional values (Table 5), based on their wet analysis.

TABLE 5

Calculated Analysis Before Processing

| Product | % DM | % CP of DM | % UIP of CP | % Methionine of UIP | % Lysine of UIP | % UIP Methionine of DM | % UIP Lysine of DM |
|---|---|---|---|---|---|---|---|
| 40% Protein | 55.0 | 45.45 | 34.82 | 1.220 | 4.834 | 0.193 | 0.765 |
| 38% Protein | 50.0 | 43.18 | 35.95 | 1.334 | 4.475 | 0.207 | 0.695 |

Comparison of Tables 2 and 5 reveals significant differences in the target nutrient values set forth in Table 2 and the actual nutritional values obtained simply by mixing the feeds. These differences are provided to the final feed or feed supplement product according to the systems and methods of the invention.

Control then proceeds to step S1030 where a decision is made whether to premix the wet distillers grains and the nutrient sources in an existing wet distiller's grains production line, or to mix them offline, such as, for example, in an off-line mixer. If it is decided to premix the ingredients offline, the control moves to step S1040, where the ingredients are premixed with the wet distiller's grains. If it is decided to mix the ingredients with wet distillers grains online, then control proceeds to step S1050. In any event, the (wet) materials are mixed according to the aforementioned formula.

In various exemplary embodiments of the invention, the mixing can be done either in a separate batch mixer, or the materials which are added to the wet corn distillers grains can be injected into the wet corn distillers grains transport system (belt or auger) just prior to the dryer. In this exemplary embodiment, a batch mixer was used.

Using a batch mixer, the ingredients were weighed using calibrated scales and placed in a mixer. In various embodiments of the systems and methods according to the invention, one may use for example, a double ribbon mixer, a paddle mixer, a rotary mixer, etc. With the addition of the last material in the formulation, the mixer is set to operate for a predetermined time. The time necessary for the mixing should be determined using known scientific principles to identify the lowest coefficient of variation for that mix in the particular mixer.

Figure 3:
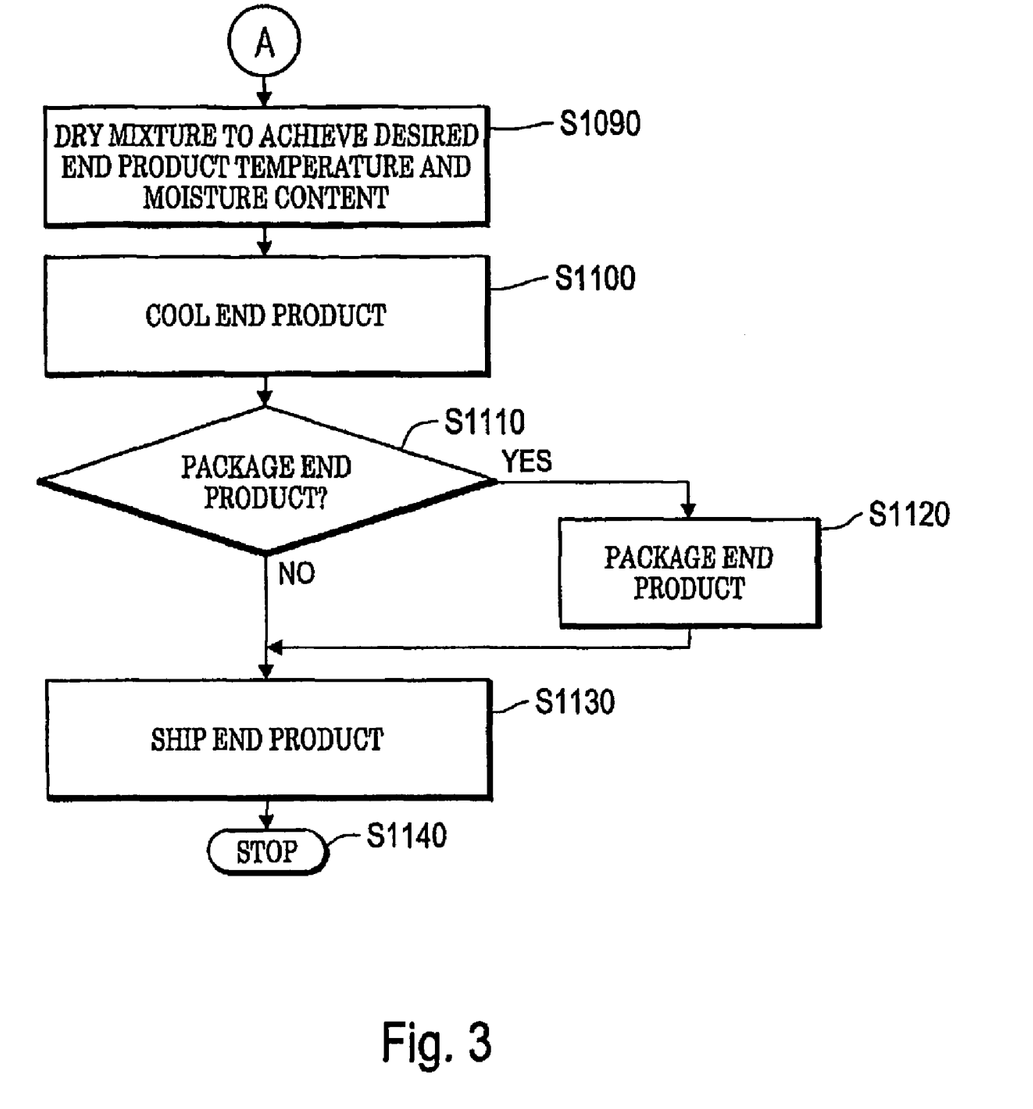

Control then proceeds to step S1060 where a determination is made whether to extrude the mixture. If so, control proceeds to step S1070, and the mixture is extruded, with or without heat added thereto, and continues from there to step S1080. The mixture may be extruded either before the dryer or after partially removing the moisture in the dryer. If an extruder is used either before or after the drier care should be taken not to apply excess heat to alter the temperature of the mixture, such as, for example, to raise the temperature of the resultant product mixture to above about 250° F., which normally reduces the post ruminal digestibility of the RUP/UIP protein. If not, control proceeds directly to a dryer in step S1080 to feed the extruded mixture into the dryer and continues after drying to step S1090. In various exemplary embodiments of the invention, the dryer may have many different configurations depending, for example, on the size and scale of the processing operation. Processing temperatures will vary depending on a number of factors, including the efficiency of the equipment, but typically are in the range of from about 200° F. to about 1000° F. It should be noted that the processing temperatures may be above 250° C., to achieve a resultant end product temperature far below that, such as, for example, between about 180° C. and about 250° C. The product exposure time in the dryer will also depend on the efficiency of applying the heat to the product.

The processing temperature used and the time of exposure will result in a final mixture temperature which will dictate the degree of conversion of rumen degradable protein to rumen undegradable protein (RUP/UIP) and the post rumen digestibility of the rumen undegradable protein. In general the higher the processing temperature and the longer the processing time the higher the resulting temperature of the mixture and the more rumen undegradable protein (RUP/UIP) produced. However, the temperature of the mixture should not exceed, in general, about 250° F. to avoid lowering the post ruminal digestibility of the RUP/UIP to an undesirable level. Results of testing at higher end product temperatures show reductions in pepsin digestibility of 20% or more when end product temperatures exceeds 230° F. Some reduction in pepsin digestibility may be acceptable based on the experience and professional judgment of the customer. Pepsin digestibility is an important characteristic of the end product and can be varied according to user demands. Acceptable final product temperatures have typically fallen within a temperature range of from about 180° F. to about 250° F.

The following two tables (Tables 6 and 7) provide a comparison of the nutrient values of the two example products before and after processing. Values are presented on a finished product (mixture) basis (12% moisture). Table 13 provides a comparison of all projected nutrient values and those nutrient values actually obtained. The final moisture level of the finished product normally will not exceed about 14% to prevent spoilage during shipment and storage.

TABLE 6

40% Product

|  | % DM | % CP of DM | % UIP of CP | % Methionine of UIP | % Lysine of UIP | % UIP Methionine of DM | % UIP Lysine of DM |
|---|---|---|---|---|---|---|---|
| Before Processing | 88.0 | 45.45 | 34.82 | 1.220 | 4.834 | 0.193 | 0.765 |
| After Processing | 88.0 | 45.45 | 75.00 | 1.580 | 4.670 | 0.539 | 1.592 |

The values of the product after processing in Table 6 and Table 7 were achieved at an end product temperature of about 218° F. The starting temperature was ambient temperature.

TABLE 7

38% Product

|  | % DM | % CP of DM | % UIP of CP | % Meth of UIP | % Lys of UIP | % UIP Meth of DM | % UIP Lys of DM |
|---|---|---|---|---|---|---|---|
| Before Processing | 88.0 | 43.18 | 35.95 | 1.334 | 4.475 | 0.207 | 0.695 |
| After Processing | 88.0 | 43.18 | 75.00 | 1.720 | 4.521 | 0.557 | 1.464 |

Analysis of Table 6 reveals that this exemplary embodiment of the systems and methods according to this invention resulted in a 115 percent increase of UIP (on a CP basis); a 30 percent increase of methionine (as a % of UIP) which then gives a 179 percent increase in UIP methionine (as a percentage of DM); and a 3.4 percent decrease of lysine (as a percentage of UIP) but an increase of 108 percent UIP lysine (as a percentage of DM). Analysis of Table 7 reveals that this exemplary embodiment of the systems and methods according to this invention resulted in a 108 percent increase of UIP (on a CP basis); a 29 percent increase of methionine (as a percentage of UIP) which then gives a 169 percent increase in UIP methionine (as a percentage of DM); and a 1.0 percent decrease of lysine (as a percentage of UIP) but an increase of 111 percent UIP lysine (as a percentage of DM).

Next, control proceeds to step S1100, where the mixture is cooled, for example, air cooled to a temperature of about 200° F. or below, if needed. From step S100 control proceeds to step S1110 where a determination is made whether to package the cooled product. If the product is to be cooled, such as, for example, by ambient or forced air, control then proceeds to step S1120 where the end product is packaged. Then control proceeds to step S1130, where it would have proceeded directly had the product not been determined to be packaged. In step S1130, the end product is shipped or transported to its final destination. Then the process ends in step S1140.

The aforementioned exemplary embodiments of the products according to the invention provide an indication of the increase in RUP/UIP protein and the amino acid levels and manipulation of the amino acid ratios in the RUP/UIP protein that is added to fermentation byproducts according to the systems, methods and resultant products of this invention. Other exemplary embodiments that have been obtained that demonstrate that the resulting feed products, including feed supplements, made using the systems and methods of this invention achieve a predictable amount of bypass protein (RUP/UIP) and amino acid content and amino acid ratios in the finished products.

In other exemplary embodiments of the systems and methods according to this invention starts with 10 percent high protein soybean meal and 90 percent wet distillers grains. The high protein soybean meal is then increased by an additional amount, such as, for example, 10 percent for each new formulation until the mixture has about 90 percent soybean meal and 10 percent wet distillers grains.

Other exemplary embodiments of the systems, methods and resultant products according to this invention repeats the aforementioned method may use, for example, canola meal in lieu of, or in addition to, soybean meal.

Other exemplary embodiments of the systems, methods and resultant products according to this invention may use mixtures of canola meal and high protein soybean meal and add a mixture, such as, for example 5% high protein soybean meal and 5% canola meal to 90% wet distillers grains, and continue to vary the relative amounts of protein mix and wet distillers grains, as above.

In another exemplary embodiment of the systems and methods according to the invention, nine batches of a formulation of 66.4% wet corn dist grains and 33.6% high protein soybean meal were mixed using mechanical equipment and then were dried in a rotary dryer. The dryer consisted of an open vessel that was controlled with a thermocouple to maintain exact temperatures. A temperature probe was inserted into the mixture and readings were monitored throughout the drying procedure.

The temperature of the mixture increased rapidly to a range of 208° F. to 210° F. and remained constant for the approximate 2 hours of drying regardless of the temperature of the vessel. A range of drying temperatures from 350° F. to 500° F. were used. At the conclusion of the drying, the temperature of the mixture would rapidly rise indicating that the moisture of the mixture was reduced and the mixture was removed from the heat source and cooled. The mixtures were allowed to reach different end temperatures and thus different end moisture levels.

Samples of the cooled product were analyzed. Results of the analyses are shown in Tables 8-16 One part of each sample was used for wet chemistry tests (shown in Table 16), including amino acid analysis, (shown in Table 15). Another part of each sample was inserted into the rumen of a fistulated dairy cow. A standard 16 hour RUP/UIP was measured and the resulting RUP/UIP was then tested for pepsin digestibility and for amino acid content. These results are shown in Tables 14 and 15.

Regression analysis of the RUP/UIP of the nine batches heated and dried according to the methods described above yielded the following results. The R Square value of the nutrient values of the nine batches indicates that 85.68% of the variation in UIP is the result of the end temperature of the mixture. This results in a calculated significance level of 0.0343%, which means that 99.97% of the time, this RUP/UIP increase will occur. In other words, these results are highly predictable and repeatable.

The results of a regression analysis as shown in Tables 8, 9, 10, 11 and 12 clearly indicate that the bypass protein (RUP/UIP) content, expressed as a percentage of the crude protein is controlled and changed in a predicable manner by the temperature of the end product. The higher the temperature, the higher the bypass protein (RUP/UIP). The duration of the temperature, or variations in applied temperature do not appear to significantly influence this relationship. In the pilot plant in which the results set forth above were obtained, the drying times were in excess of two hours and the product was held at a temperature near the boiling point of water for most of that time.

Based on results as shown in Table 8, it is evident that the bypass protein RUP/UIP) of the nutritionally enhanced fermentation byproduct may be controlled based on the temperature of the end product, whether it is a complete feed or a feed supplement. A formula expressing this relationship is:

$$UIP\,(\%\,of\,CP) = (End\,Temp \times 0.819) - 107.644, \quad (R^2 = 85.68\%) \tag{1}$$

Using equation (1) one can calculate the RUP/UIP of a mixture. For example, i.e., if the end temperature is 220° F., then the RUP/UIP will be 0.819 times 220 minus 107.644, which equals 72.54% RUP/UIP.

The data shown in Table 9 also reveal that pepsin digestibility was less predictable based on the product end temperature, but reached significant levels. The data was analyzed as a linear regression, but it appears that the one sample that had the highest bypass protein (RUP/UIP) had a depressed pepsin digestibility, making the relationship between bypass protein (RUP/UIP) and pepsin digestibility quadratic. It was also apparent that too much heat (amount and/or duration) adversely affects the pepsin digestibility of the end product. End temperature can range from 211° F. to 223° F. for the production of acceptable product without undue losses in digestibility.

TABLE 8

Regression Analysis of Experimental Mixtures

REGRESSION OF UIP % OF CP AND END TEMPERATURES
SUMMARY OUTPUT

| End Temp | UIP % CP Average |
|---|---|
| 195 | 53.68 |
| 218 | 74.50 |
| 229 | 82.93 |
| 208 | 65.87 |
| 218 | 67.48 |
| 209 | 62.07 |
| 214 | 65.32 |
| 208 | 63.31 |
| 214 | 62.75 |

Regression Statistics

| | |
|---|---|
| Multiple R | 0.9256589 |
| R Square | 0.856844399 |
| Adjusted R Square | 0.836393598 |
| Standard Error | 3.338503243 |
| Observations | 9 |

ANOVA

| | df | SS | MS | F | Significance F |
|---|---|---|---|---|---|
| Regression | 1 | 466.9767529 | 466.9767529 | 41.89784214 | 0.000342787 |
| Residual | 7 | 78.01922732 | 11.1456039 | | |
| Total | 8 | 544.9959802 | | | |

| | Coefficients | Standard Error | t Stat | P-value | Lower 95% | Upper 95% | Lower 95.0% | Upper 95.0% |
|---|---|---|---|---|---|---|---|---|
| Intercept | 107.644092 | 26.91669969 | −3.9991564 | 0.00519549 | −171.2919273 | −43.9962566 | −171.2919273 | −43.99625659 |
| X Variable 1 | 0.818980743 | 0.126525442 | 6.47285425 | 0.000342787 | 0.519795829 | 1.118165656 | 0.519795829 | 1.118165656 |

TABLE 9

REGRESSION OF PEPSIN DIG. AND END TEMPERATURES

SUMMARY OUTPUT

| End Temp | 0.0002% Pepsin Dig |
|---|---|
| 195 | 79.52 |
| 218 | 63.11 |
| 229 | 43.13 |
| 208 | 54.02 |
| 218 | 59.63 |
| 209 | 64.19 |
| 214 | 63.11 |
| 208 | 62.31 |
| 214 | 67.67 |

Regression Statistics

| | |
|---|---|
| Multiple R | 0.801941608 |
| R Square | 0.643110343 |
| Adjusted R Square | 0.592126107 |
| Standard Error | 6.272275244 |
| Observations | 9 |

ANOVA

| | df | SS | MS | F | Significance F |
|---|---|---|---|---|---|
| Regression | 1 | 496.2491651 | 496.2491651 | 12.6139055 | 0.009323658 |
| Residual | 7 | 275.3900571 | 39.34143673 | | |
| Total | 8 | 771.6392222 | | | |

| | Coefficients | Standard Error | t Stat | P-value | Lower 95% | Upper 95% | Lower 95.0% | Upper 95.0% |
|---|---|---|---|---|---|---|---|---|
| Intercept | 241.3064906 | 50.57025165 | 4.771708321 | 0.002031694 | 121.7269327 | 360.8860485 | 121.7269327 | 360.8860485 |
| X Variable 1 | −0.8442595 | 0.237712034 | −3.55160604 | 0.009323658 | −1.406358733 | −0.28216026 | −1.406358733 | −0.282160258 |

Another statistically significant result of these examples is that the bypass protein (RUP/UIP) content is inversely related to the moisture content of the end product (Table 12). This relationship is described by the regression equation:

$$UIP\ (\%\ of\ CP) = 87.536 - (1.133 \times Moisture),$$
$$(R^2 = 95.58\%). \quad (2)$$

This equation also calculates the RUP/UIP of a mixture, but based on its end moisture content after drying. Accordingly, the RUP/UIP for a product with an end moisture of 11% will be 1.133 times 11 subtracted from 87.536, which equals 75.07% RUP/UIP.

This appears to be due to the fact that the dryer moisture content increased when the end product was allowed to reach a temperature above the boiling point of water. These experiments were done at ambient atmospheric pressure. The aforementioned data indicate that there is an ideal temperature and moisture point range which includes about 218° F. and about 12% water moisture content.

Moreover, experiments indicate that the drying temperature, measured, for example, by the temperature of the vessel in which the heating took place, apparently only affects pepsin digestibility, and the relationship between the temperature and the pepsin digestibility is relatively weak (Table 11). The one value for the lowest heating (350° F.) caused the relationship to approach significance but all other values within normal range are basically random.

A regression analysis of UIP % of CP and vessel temperatures (Table 10) for the nine batches reveals that the R Square value is close to zero and, thus, there does not appear to be a predictable relationship between the vessel temperature (drying temperature) and the UIP content.

TABLE 10

REGRESSION OF UIP % OF CP AND VESSEL TEMPERATURES

SUMMARY OUTPUT

| Vessel Temp | UIP % CP Average |
|---|---|
| 350 | 53.68 |
| 450 | 74.50 |
| 450 | 82.93 |
| 500 | 65.87 |
| 500 | 67.48 |
| 475 | 62.07 |

TABLE 10-continued

REGRESSION OF UIP % OF CP AND VESSEL TEMPERATURES

| | |
|---|---|
| 475 | 65.32 |
| 475 | 63.31 |
| 475 | 62.75 |

Regression Statistics

| | |
|---|---|
| Multiple R | 0.331847778 |
| R Square | 0.110122948 |
| Adjusted R Square | −0.01700235 |
| Standard Error | 8.323627442 |
| Observations | 9 |

ANOVA

| | df | SS | MS | F | Significance F |
|---|---|---|---|---|---|
| Regression | 1 | 60.01656372 | 60.01656372 | 0.866255209 | 0.382970754 |
| Residual | 7 | 484.9794165 | 69.28277379 | | |
| Total | 8 | 544.9959802 | | | |

| | Coefficients | Standard Error | t Stat | P-value | Lower 95% | Upper 95% | Lower 95.0% | Upper 95.0% |
|---|---|---|---|---|---|---|---|---|
| Intercept | 38.53081921 | 30.10892693 | 1.279714129 | 0.241424449 | −32.66542866 | 109.7270671 | −32.66542866 | 109.7270671 |
| X Variable 1 | 0.060514689 | 0.06501864 | 0.930728322 | 0.382970754 | −0.093229853 | 0.214259231 | −0.093229853 | 0.214259231 |

TABLE 11

REGRESSION OF PEPSIN DIGESTIBILITY AND VESSEL TEMPERATURE

SUMMARY OUTPUT

| Vessel Temp | 0.0002% Pepsin Dig |
|---|---|
| 350 | 79.52 |
| 450 | 63.11 |
| 450 | 43.13 |
| 500 | 54.02 |
| 500 | 59.63 |
| 475 | 64.19 |
| 475 | 63.11 |
| 475 | 62.31 |
| 475 | 67.67 |

Regression Statistics

| | |
|---|---|
| Multiple R | 0.56885562 |
| R Square | 0.323596717 |
| Adjusted R Square | 0.226967676 |
| Standard Error | 8.634972937 |
| Observations | 9 |

ANOVA

| | df | SS | MS | F | Significance F |
|---|---|---|---|---|---|
| Regression | 1 | 249.6999188 | 249.6999188 | 3.348855739 | 0.109947303 |
| Residual | 7 | 521.9393034 | 74.56275763 | | |
| Total | 8 | 771.6392222 | | | |

| | Coefficients | Standard Error | t Stat | P-value | Lower 95% | Upper 95% | Lower 95.0% | Upper 95.0% |
|---|---|---|---|---|---|---|---|---|
| Intercept | 118.7711864 | 31.2351521 | 3.802484651 | 0.006693083 | 44.91184111 | 192.6305318 | 44.91184111 | 192.6305318 |
| X Variable 1 | −0.1234339 | 0.067450663 | −1.82998791 | 0.109947303 | −0.282929259 | 0.036061462 | −0.282929259 | 0.036061462 |

A regression analysis of pepsin digestibility and vessel temperature for the nine batches reveals that the R Square value is a little higher, but a long way from indicating a significant relationship between the vessel temperature and the pepsin digestibility. However, the P value shows that the relationship is approaching significance and is close to 10%.

A regression analysis of UIP % of CP and final moisture (Table 12) for the nine batches reveals the highest correlation that we have in the data set with the R Square showing that 95.58% of the variation in UIP content is related to the moisture of the end product. What this means in practical terms is that the increase in RUP/UIP can be achieved by drying the mixed product to a final moisture content of about 8 to 12%, provided the end product reaches the desirable temperature of 211 to 223° F.

However, the relationship of end moisture level to RUP/UIP appears to be an anomaly because in subsequent research moisture levels approaching 0% were measured in relation to achieving the desirable RUP/UIP.

The regression analysis statistics for the nine batches are set forth in the product mixture Tables 8, 9, 10, 11, and 12.

TABLE 12

REGRESSION OF UIP % OF CP AND FINAL MOISTURE

SUMMARY OUTPUT

| H2O | UIP % CP Average |
|---|---|
| 29.30 | 53.68 |
| 12.30 | 74.50 |
| 4.20 | 82.93 |
| 19.20 | 65.87 |
| 19.00 | 67.48 |
| 24.50 | 62.07 |
| 19.90 | 65.32 |
| 18.00 | 63.31 |
| 21.20 | 62.75 |

Regression Statistics

| | |
|---|---|
| Multiple R | 0.97763147 |
| R Square | 0.955763291 |
| Adjusted R Square | 0.949443761 |
| Standard Error | 1.855833613 |
| Observations | 9 |

ANOVA

| | df | SS | MS | F | Significance F |
|---|---|---|---|---|---|
| Regression | 1 | 520.8871514 | 520.8871514 | 151.2396181 | 5.39244E−06 |
| Residual | 7 | 24.1088288 | 3.4441184 | | |
| Total | 8 | 544.9959802 | | | |

| | Coefficients | Standard Error | t Stat | P-value | Lower 95% | Upper 95% | Lower 95.0% | Upper 95.0% |
|---|---|---|---|---|---|---|---|---|
| Intercept | 87.53634296 | 1.823964222 | 47.99235747 | 4.46139E−10 | 83.22335602 | 91.84932991 | 83.22335602 | 91.84932991 |
| X Variable 1 | −1.13313695 | 0.092140299 | −12.2979518 | 5.39244E−06 | −1.351013983 | −0.91525992 | −1.351013983 | −0.915259924 |

TABLE 13

Mixture: Wet Corn Dist Grains 66.4%, High Protein Soybean Meal 33.6%

| Nutrient | Target | Calculated Values for Mixture | | |
|---|---|---|---|---|
| | | Wet | Dry | Actual |
| Nutrients, % of Sample | | | | |
| Dry Matter | 88.000 | 49.478 | 89.421 | 88.40 |
| Neutral Detergent Fiber | | 8.919 | 18.506 | 16.23 |
| Effective NDF | | 0.806 | 1.543 | 0.00 |
| Crude Protein | 40.000 | 22.700 | 40.558 | 38.66 |
| CP Sol Protein | | 3.624 | 8.265 | 4.44 |

TABLE 13-continued

Mixture: Wet Corn Dist Grains 66.4%, High Protein Soybean Meal 33.6%

| Nutrient | Target | Calculated Values for Mixture | | |
|---|---|---|---|---|
| | | Wet | Dry | Actual |
| UIP | 30.000 | 8.075 | 15.258 | 28.80 |
| ADF Protein | | 1.780 | 3.003 | 2.42 |
| Fat | | 3.133 | 5.805 | 5.45 |
| Acid Det Fibre | | 5.714 | 9.838 | 10.14 |
| Ash | | 2.896 | 4.453 | 4.33 |
| NSC Starch | | 11.617 | 17.407 | 29.67 |
| NDF Lignin | | 0.780 | 1.534 | 2.25 |
| Sol Protein NPN | | 2.083 | 5.312 | |
| NDF Insoluble Protein | | 3.248 | 3.899 | 5.21 |
| UIP Amino Acids, % of Sample | | | | |
| Methionine | | 0.148 | 0.199 | 0.46 |
| Lysine | | 0.389 | 0.656 | 1.35 |
| Arginine | | 0.451 | 0.778 | 1.70 |

TABLE 13-continued

Mixture: Wet Corn Dist Grains 66.4%, High Protein Soybean Meal 33.6%

| Nutrient | Target | Calculated Values for Mixture Wet | Dry | Actual |
|---|---|---|---|---|
| Threonine | | 0.320 | 0.490 | 1.13 |
| Leucine | | 0.879 | 1.119 | 2.83 |
| Isoleucine | | 0.364 | 0.559 | 1.25 |
| Valine | | 0.439 | 0.704 | 1.45 |
| Histidine | | 0.200 | 0.309 | 0.73 |
| Phenylalanine | | 0.438 | 0.636 | 1.51 |
| Tryptophan | | 0.132 | 0.209 | |
| Methionine, % of UIP | 1.610 | 1.830 | 1.560 | 1.58 |
| Lysine, % of UIP | 4.700 | 4.810 | 5.150 | 4.67 |
| Isoleucine, % of UIP | | 4.510 | 4.390 | 4.34 |
| UIP % CP | 75.000 | 35.570 | 37.620 | 74.50 |
| Lysine to Methionine ratio | | 2.628 | 3.301 | 2.96 |
| Total Amino Acids, % of Sample | | | | |
| Methionine | | 0.342 | 0.670 | 0.57 |
| Lysine | | 1.191 | 2.147 | 1.96 |
| Arginine | | 1.430 | 2.616 | 2.31 |
| Threonine | | 0.856 | 1.558 | 1.44 |
| Leucine | | 1.981 | 3.476 | 3.54 |
| Isoleucine | | 0.959 | 1.780 | 1.61 |
| Valine | | 1.117 | 2.048 | 1.87 |
| Histidine | | 0.613 | 1.087 | 1.02 |
| Phenylalanine | | 1.772 | 3.262 | 1.88 |
| Tryptophan | | 0.276 | 0.494 | |
| Minerals, % of Sample | | | | |
| Calcium | | 0.128 | 0.229 | 0.38 |
| Phosphorus | | 0.372 | 0.665 | 0.69 |
| Magesium | | 0.154 | 0.276 | 0.29 |
| Potassium | | 0.911 | 1.628 | 1.35 |
| Sulphur | | 0.254 | 0.455 | 0.46 |
| Sodium | | 0.056 | 0.099 | 0.12 |
| Chloride | | 0.051 | 0.090 | 0.17 |
| Trace Minerals, ppm | | | | |
| Iron | | 62.264 | 111.246 | 103.21 |
| Zinc | | 28.586 | 51.073 | 48.99 |
| Copper | | 5.717 | 10.215 | 18.12 |
| Manganese | | 17.661 | 31.554 | 23.06 |

TABLE 15

Amino Acid Analysis - gm/100 gm of Protein

| Amino Acids | Values after Drying Corn Dist and Soy Total AA | Values after Drying Corn Dist and Soy UIP AA | Wet Corn Dist UIP AA | Hi-Pro Soy UIP AA | Commercial Corn Dist Dried Gr UIP AA |
|---|---|---|---|---|---|
| Methionine | 1.43 | 1.59 | 2.07 | 1.70 | 2.23 |
| Lysine | 4.96 | 4.67 | 2.13 | 6.35 | 2.21 |
| Arginine | 5.75 | 5.92 | 3.34 | 6.87 | 3.53 |
| Threonine | 3.59 | 3.95 | 3.66 | 4.13 | 3.66 |
| Leucine | 8.79 | 9.85 | 14.75 | 8.68 | 13.99 |
| Isoleucine | 4.01 | 4.27 | 3.63 | 5.01 | 3.89 |
| Valine | 4.67 | 4.95 | 5.09 | 5.64 | 5.05 |
| Histidine | 2.54 | 2.54 | 2.15 | 2.66 | 2.34 |
| Phenylalanine | 4.68 | 5.23 | 5.65 | 5.30 | 5.59 |
| Tryptophan | — | — | — | — | — |
| Cystine | 1.64 | 1.60 | 1.88 | 1.82 | 2.01 |
| Methionine + Cystine | 3.07 | 3.19 | 3.96 | 3.52 | 4.24 |
| Tyrosine | 3.30 | 3.73 | 4.39 | 3.96 | 4.24 |
| Serine | 4.02 | 4.75 | 4.41 | 4.30 | 4.22 |
| Aspartic Acid | 9.00 | 10.01 | 6.16 | 11.50 | 6.35 |
| Glutamic Acid | 15.46 | 18.11 | 19.35 | 16.76 | 18.61 |
| Proline | 4.94 | 5.67 | 7.86 | 4.86 | 7.92 |
| Glyccine | 3.74 | 3.90 | 3.12 | 4.34 | 3.30 |
| Alanine | 4.76 | 5.25 | 7.97 | 4.67 | 7.64 |
| Hydroxyproline | 0.13 | 0.12 | 0.27 | 0.00 | 0.20 |
| Hydroxylysine | 0.00 | 0.00 | 0.00 | 0.00 | 0.00 |
| Taurine | 0.14 | 0.08 | 0.16 | 0.00 | 0.00 |
| Lanthionine | 0.02 | 0.07 | 0.13 | 0.06 | 0.13 |
| Ornithine | 0.09 | 0.25 | 0.05 | 0.05 | 0.08 |

TABLE 16

Values as % of Dry Matter

| | Experimental Mixture Average of 9 | Corn DDG Air Dried | Soy Meal | Corn DDG Commercial |
|---|---|---|---|---|
| Moisture | 20.04 | 22.3 | 12.5 | 9.2 |
| Dry Matter | 79.96 | 77.7 | 87.5 | 90.8 |

TABLE 14

"In vivo" Data on Experimental Mixtures

| Mixture | Vessel Temp | End Temp | End Moisture | Prot | H2O | Prot DM Basis | Cow "A" | Cow "B" | Cow "C" | Average | Pepsin Dig | Dig. UIP % of CP |
|---|---|---|---|---|---|---|---|---|---|---|---|---|
| 1 | 350 | 195 | 33.8 | 31.57 | 29.30 | 44.65 | 55.76 | 55.85 | 49.44 | 53.68 | 79.52 | 42.69 |
| 2 | 450 | 218 | 12.1 | 38.38 | 12.30 | 43.76 | 75.57 | 73.62 | 74.32 | 74.50 | 63.11 | 47.02 |
| 3 | 450 | 229 | 5.3 | 42.46 | 4.20 | 44.32 | 86.20 | 80.84 | 81.76 | 82.93 | 43.13 | 35.77 |
| 4 | 500 | 208 | na | 35.17 | 19.20 | 43.53 | 71.84 | 68.74 | 57.03 | 65.87 | 54.02 | 35.58 |
| 5 | 500 | 218 | 18.4 | 32.94 | 19.00 | 40.67 | 69.28 | 69.50 | 63.66 | 67.48 | 59.63 | 40.24 |
| 6 | 475 | 209 | 20.1 | 31.51 | 24.50 | 41.74 | 61.32 | 57.93 | 66.96 | 62.07 | 64.19 | 39.84 |
| 7 | 475 | 214 | 17.8 | 34.37 | 19.90 | 42.91 | 69.15 | 62.42 | 64.39 | 65.32 | 63.11 | 41.22 |
| 8 | 475 | 208 | 18.3 | 36.38 | 18.00 | 44.37 | 66.30 | 58.51 | 65.11 | 63.31 | 62.31 | 39.45 |
| 9 | 475 | 214 | na | 35.50 | 21.20 | 45.05 | 61.06 | 62.95 | 64.23 | 62.75 | 67.67 | 42.46 |
| Wet Corn Dist | air dry | | | 24.87 | 22.70 | 32.17 | 44.08 | 43.81 | 48.86 | 45.58 | 26.01 | 11.86 |
| 48% Soy | Commercial | | | 46.81 | 11.00 | 52.60 | 22.86 | 26.17 | 45.04 | 31.36 | 94.96 | 29.78 |
| Dry Corn Dist | Commercial | | | 30.54 | 7.00 | 32.84 | 49.62 | 53.81 | 50.83 | 51.42 | 24.87 | 12.79 |

TABLE 16-continued

Values as % of Dry Matter

| | Experimental Mixture Average of 9 | Corn DDG Air Dried | Soy Meal | Corn DDG Commercial |
|---|---|---|---|---|
| Crude Protein, % DM | 42.98 | 29.6 | 53.6 | 33.2 |
| Available Protein, % DM | 40.29 | 25.5 | 52.1 | 27.1 |
| Unavailable Protein, % DM | 2.70 | 4 | 1.5 | 6.1 |
| Neutral Det. Crude Protein, % DM | 6.26 | 4.7 | 1 | 7.5 |
| Adjusted Protein, % DM | 42.98 | 28.5 | 53.6 | 30.4 |
| Soluble Protein, % DM | 5.21 | 3.3 | 10 | 6.1 |
| Soluble Protein % of CP | 12.13 | 11.3 | 18.6 | 18.4 |
| TDN, % DM | 84.87 | 91.5 | 84.6 | 92 |
| Net Energy Lactation, Mcal/lb | 0.90 | 1 | 0.89 | 1 |
| Net Energy Maintenance, Mcal/lb | 0.95 | 1.03 | 0.94 | 1.04 |
| Net Energy Gain, Mcal/lb | 0.65 | 0.72 | 0.64 | 0.72 |
| Acid Detergent Fiber, % DM | 11.52 | 21.1 | 3.9 | 21.1 |
| Neutral Detergent Fiber, % DM | 18.75 | 33.3 | 7.7 | 38 |
| Crude Fat, % DM | 6.13 | 14.7 | 1.1 | 13.4 |
| Lignin, % DM | 2.58 | 4 | 0.6 | 3.1 |
| Lignin/NDF Ratio | 13.80 | 12 | 7.9 | 8.2 |
| Ash, % DM | 4.94 | 4.3 | 5.9 | 2.5 |
| Starch, % DM | 3.80 | 8.5 | 2.9 | 6.4 |
| Sugar, % DM | 10.15 | 4.9 | 11.1 | 5.8 |
| Enzymatic NSC, % DM | 13.95 | 13.4 | 14 | 12.2 |
| NFC, % DM | 33.51 | 22.8 | 32.7 | 20.4 |
| Calcium, % DM | 0.44 | 0.09 | 0.68 | 0.03 |
| Phosphorus, % DM | 0.78 | 0.97 | 0.76 | 0.79 |
| Magnesium, % DM | 0.32 | 0.42 | 0.31 | 0.32 |
| Potassium, % DM | 1.51 | 1.08 | 2.03 | 0.81 |
| Sulfur, % DM | 0.53 | 0.47 | 0.42 | 0.72 |
| Sodium, % DM | 0.13 | 0.222 | 0.031 | 0.126 |
| Iron, PPM | 116.52 | 182 | 117 | 88 |
| Manganese, PPM | 26.00 | 19 | 34 | 13 |
| Zinc, PPM | 55.92 | 82 | 45 | 45 |
| Copper, PPM | 21.20 | 30 | 18 | 6 |
| Chloride Ion, % DM | 0.20 | 0.27 | 0.03 | 0.24 |

In another exemplary embodiment of the systems and methods according to the invention, a number of different formulations of wet corn dist grains, soybean meal and in 2 instances blood meal were mixed and subsequently dried (Table 17). Whereas in the previously mentioned nine-batch exemplary embodiment, exact temperatures of the drying process were measured, a purpose of the instant exemplary embodiment was to test different formulations over a variety of simulated commercial situations.

In this instant exemplary embodiment, pure corn distillers grains and pure soybean meal were dried along with various mixtures of these two ingredients. The mixtures ranged from 48% wet corn dist grains-52% soybean meal to 17% wet corn dist grains-83% soybean meal.

Drying temperatures were tested from a low 257° F. to a high of 379° F. As in experiment #1, the temperature at the end of the drying period tends to rise and these are noted in Table 17 (temperatures are dryer temp and not product temp).

The results clearly demonstrate that the RUP/UIP of the formulas is increased more than two-fold due to the heat applied during drying. The data also show that application of higher temperatures will impart greater RUP/UIP percentages; but, the higher heat will also decrease the pepsin digestibility as indicated by both the measurements at 0.02% and 0.0002% pepsin.

The RUP/UIP of corn distillers grains was increased to maximum levels by the application of lower dryer temperatures as compared to soybean meal. Soybean meal dried at the highest temperatures doubled in RUP/UIP content, but did not achieve levels equal to those of the 83% soybean meal-17% wet corn distillers grains formula. A Maillard reaction, which may account for the change in RUP/UIP, may involve a complexing of the protein with the carbohydrate during heating in the test material. In one treatment, sucrose was added to pure soybean meal with little effect. Simple sugars do not appear to be involved in this reaction, whereas, the complex polysaccharides of the corn distillers grains work very well. Maillard reactions are discussed extensively in the literature and derive from the seminal work by L.-C. Maillard, which appeared in *Comptes Rendus Acad. Sci. Ser.* 2, vol. 54, page 66 (1912).

Very high RUP/UIP values were achieved with all the formulations of wet corn distillers grains and soybean meal.

The systems, methods and resultant products of this invention do not need all of the processing to be performed by a distiller, brewer or fermenter. Instead, the fermentation byproducts can by transported, such as, for example, by a pipeline or truck, to another location for processing.

While this invention has been described in conjunction with the specific embodiments above, it is evident that many alternatives, combinations, modifications, and variations are apparent to those skilled in the art. Accordingly, the preferred embodiments of this invention, as set forth above are intended to be illustrative, and not limiting. Various changes can be made without departing from the spirit and scope of this invention.

TABLE 17

Experiment #2

| Sample Description | pH | Protein % of DM | Dryer Temp at End (° F.) | Average Dryer Temp (° F.) | Heating Time (min) | Bypass Protein, % of CP | | 0.02% Pepsin Dig. | | 0.0002% Pepsin Dig. at |
|---|---|---|---|---|---|---|---|---|---|---|
| | | | | | | UIP at Start | UIP at End | at Start | at End | Start |
| Corn Dist Grains - 100% | | 29.3 | 257 | 257 | 240 | 45.58 | 71.21 | 74.39 | 72.12 | 26.01 |
| Corn Dist Grains - 100% | | 30.0 | 320 | 289 | 105 | 45.58 | 93.30 | 74.39 | 63.59 | 26.01 |
| Soybean Meal - 100% | | 52.7 | 392 | 379 | 60 | 31.36 | 65.60 | 98.64 | 95.51 | 94.96 |
| Soy ML + 0.5% Sucrose | | 53.5 | 392 | 379 | 60 | 31.36 | 67.48 | 98.64 | 92.52 | 94.96 |
| Corn Dist 48%-Soy 52% | | 42.8 | 392 | 379 | 105 | 33.70 | 79.39 | 93.25 | 86.89 | 79.63 |
| Corn Dist 38%-Soy 62% | 5.3 | 46.2 | 392 | 330 | 105 | 33.03 | 76.88 | 94.70 | 87.94 | 83.77 |
| Corn Dist 38%-Soy 62% | | 46.1 | 338 | 298 | 120 | 33.03 | 62.97 | 94.70 | 91.79 | 83.77 |
| Corn Dist 38%-Soy 62% | | 46.5 | 320 | 289 | 105 | 33.03 | 64.28 | 94.70 | 92.12 | 83.77 |
| Corn Dist 38%-Soy 62% | | 44.9 | 257 | 257 | 150 | 33.03 | 64.53 | 94.70 | 94.03 | 83.77 |
| Corn Dist 38%-Soy 62% | 4.9 | 44.1 | 392 | 322 | 105 | 33.03 | 68.43 | 94.70 | 86.89 | 83.77 |

TABLE 17-continued

Experiment #2

| Sample Description | pH | Protein % of DM | Dryer Temp at End (° F.) | Average Dryer Temp (° F.) | Heating Time (min) | Bypass Protein, % of CP UIP at Start | Bypass Protein, % of CP UIP at End | 0.02% Pepsin Dig. at Start | 0.02% Pepsin Dig. at End | 0.0002% Pepsin Dig. at Start |
|---|---|---|---|---|---|---|---|---|---|---|
| Corn Dist 38%-Soy 62% | 5.5 | 45.6 | 392 | 322 | 115 | 33.03 | 69.52 | 94.70 | 79.34 | 83.77 |
| Dist Sol 40%-Soy 60% |  | 48.7 | 392 | 330 | 60 | 27.44 | 66.98 | 98.47 | 90.14 | 94.63 |
| Corn Dist 28%-Soy 72% |  | 49.3 | 392 | 379 | 105 | 32.46 | 81.06 | 96.01 | 88.36 | 87.48 |
| Corn Dist 17%-Soy 83% | 6.0 | 52.4 | 392 | 379 | 90 | 31.97 | 76.65 | 97.15 | 90.06 | 90.72 |
| Corn Dist 17%-Soy #2 83% |  | 50.9 | 392 | 379 | 85 | 31.97 | 71.92 | 97.15 | 93.07 | 90.72 |
| Corn Dist 17%-Soy 83% | 4.0 | 50.0 | 392 | 379 | 80 | 31.97 | 66.88 | 97.15 | 92.58 | 90.72 |
| Corn Dist 17%-Soy 83% | 7.2 | 48.3 | 392 | 379 | 80 | 31.97 | 76.24 | 97.15 | 93.59 | 90.72 |
| Corn Dist 62%-Soy 26%-Blood 12% |  | 54.7 | 392 | 379 | 80 | 56.32 | 70.32 | 94.22 | 90.92 | 84.96 |
| Corn Dist 43%-Soy 42%-Blood 15% |  | 57.9 | 392 | 379 | 80 | 54.36 | 82.96 | 96.05 | 93.47 | 90.18 |

What is claimed is:

1. A method of predictably enhancing the nutrient value of distillers, brewers or fermenters grain byproducts, and of producing a protein feed or feed supplement end product having a crude protein content of over about 30% of the feed or feed supplement end product composition on a dry matter basis, and at least one of (1) a UIP/RUP content of over 50% and up to about 83% of the crude protein, (2) amino acid levels in the crude protein and in the RUP/UIP of greater than 1% and up to about 2% methionine and 2% and up to about 8% lysine, or (3) a post ruminal digestibility of the UIP/RUP of over 60% and up to about 94%, comprising:

determining the desirable levels of crude protein, UIP/RUP, amino acids and post ruminal digestibility in an end product;

creating a distillers, brewers or fermenters grain by-product-nutrient source mixture having an enhanced nutrient value by (a) adding one or more crude protein and/or amino acid content nutrient sources comprising canola meal, soybean meal, sunflower meal into wet distillers, brewers or fermenters by-products based on the crude protein, UIP protein, amino acid content, UIP/RUP amino acid content of the added nutrient sources; and (b) adjusting the temperature and/or the moisture content of the enhanced nutrient value by-product-nutrient source mixture based on an empirically derived relationship that relates the UIP as a percent of the crude protein (CP) to an end product temperature in a predictable and repeatable manner to produce said end product, wherein the empirically derived relationship that relates the UIP as a percent of the crude protein (CP) is the following formula:

$$UIP\ (\%\ of\ CP) = (\text{End Product Temperature}\ °F. \times 0.819) - 107.644.$$

2. The end product made by the process of claim 1.

3. The method of claim 1, wherein the upper level of the amino acids as a percentage of the RUP/UIP is about 2% for methionine and about 7% for lysine.

4. The method of claim 1, wherein the rumen undegradable protein (RUP/UIP) of the wet byproducts-nutrient-source mixture is increased in a range of from about 27% to about 83%.

5. The method of claim 1, wherein the end product moisture level is in a range from about 0% to about 14%.

6. The method of claim 1, wherein the UIP of the wet by products-nutrient-source mixture, on a crude protein basis, is increased by about 115 percent; methionine, as a percentage of UIP, is increased about 30 percent; UIP methionine, as a percentage of dry matter, is increased by about 179 percent; lysine, as a percentage of UIP is decreased by about 3.4 percent; and UIP lysine, as a percentage of dry matter, is increased by about 108 percent.

7. The method of claim 1, wherein the UIP of the wet byproducts-nutrient-source mixture, on a crude protein basis, is increased by about 108 percent; methionine, as a percentage of UIP, is increased about 30 percent; UIP methionine, as a percentage of dry matter, is increased by about 169 percent; lysine, as a percentage of UIP is decreased by about 1.0 percent; and UIP lysine, as a percentage of dry matter, is increased by about 111 percent.

8. The method of claim 1, wherein the distillation and/or fermentation by-product-nutrient source mixture having an enhanced nutrient value is a mixture of about two-thirds wet corn distillers grains and about one third high protein soybean meal.

9. The method of claim 1, wherein the end product crude protein is in a range up to about 54 percent of the end product composition.

10. The method of claim 1, wherein the end product UIP is in a range from about 63% to about 83 percent of the end product composition.

11. The method of claim 1, wherein the UIP content of the end product has a pepsin digestibility in a range of about 74% to about 94%.

12. The method of claim 1, wherein the crude protein range in the end product is from about 30% to about 58%; the UIP range in the end product is from about 63% to about 83% of the crude protein; and the post ruminal pepsin digestibility range is from about 63% to about 94% of the UIP.

13. The method of claim 1, wherein the bypass protein (RUP/UIP) level of the end product is increased to between one and one-fourth times and approximately two and one-half times the original level of the byproduct-nutrient-source mixture, wherein the RUP/UIP in the end product is from about 50% up to about 83% of the crude protein level.

14. The method of claim 1, wherein the temperature of mixture is increased to a range of about 208 degrees Farenheit to about 210 degrees Farenheit.

15. The method of claim 1, wherein the temperature is adjusted to achieve an end product temperature in a range of from about 211 degrees Farenheit to about 223 degrees Farenheit.

16. The method of claim 1, wherein the temperature is in a range that causes denaturation of the protein of the by-product-nutrient source mixture.

17. The method of claim 1, wherein temperature of the by-product-nutrient-source mixture is adjusted in a range from about 180° F. to about 250° F.

18. The method of claim 1, wherein the temperature of the by-product-nutrient-source mixture is adjusted to be about 218° F.

19. A method of predictably enhancing the nutrient value of distillers, brewers or fermenters grain byproducts, and of producing a protein feed or feed supplement end product having a crude protein content of over about 30% of the feed or feed supplement end product composition on a dry matter basis, and at least two of (1) a UIP/RUP content of over 50% and up to about 83% of the crude protein, (2) amino acid levels in the crude protein and in the RUP/UIP of greater than 1% and up to about 2% methionine and 2% and up to about 8% lysine, or (3) a post ruminal digestibility of the UIP/RUP of over 60% and up to about 94%, comprising:
  determining the desirable levels of crude protein, UIP/RUP, amino acids and post ruminal digestibility in an end product;
  creating a distillers, brewers or fermenters grain by-product-nutrient source mixture having an enhanced nutrient value by (a) adding one or more crude protein and/or amino acid content nutrient sources comprising canola meal, soybean meal, sunflower meal into wet brewers, distillers or fermenters byproducts based on the crude protein, UIP protein, amino acid content, UIP/RUP amino acid content of the added nutrient sources; and (b) adjusting the temperature and/or the moisture content of the enhanced nutrient value by-product-nutrient source mixture based on an empirically derived relationship that relates the UIP as a percent of the crude protein (CP) to an end product temperature in a predictable and repeatable manner to produce said end product,
  wherein the empirically derived relationship that relates the UIP as a percent of the crude protein (CP) is adjusted according to the following formula:

$$UIP (\% \text{ of } CP) = (\text{End Product Temperature } ° F. \times 0.819) - 107.644.$$

20. The end product made by the process of claim 19.

21. A method of predictably enhancing the nutrient value of distillers, brewers or fermenters grain byproducts, and of producing a protein feed or feed supplement end product having a crude protein content of over about 30% of the feed or feed supplement end product composition on a dry matter basis, and a UIP/RUP content of over 50% and up to about 83% of the crude protein, amino acid levels in the crude protein and in the RUP/UIP of greater than 1% and up to about 2% methionine and 2% and up to about 8% lysine, and a post ruminal digestibility of the UIP/RUP of over 60% and up to about 94%, comprising:
  determining the desirable levels of crude protein, UIP/RUP, amino acids and post ruminal digestibility in an end product;
  creating a distillers, brewers or fermenters grain by-product by-product-nutrient source mixture having an enhanced nutrient value by (a) adding one or more crude protein and/or amino acid content nutrient sources comprising canola meal, soybean meal, sunflower meal into wet distillers, brewers of fermenters byproducts based on the crude protein, UIP protein, amino acid content, UIP/RUP amino acid content of the added nutrient sources; and (b) adjusting the temperature and/or the moisture content of the enhanced nutrient value by-product-nutrient source mixture based on an empirically derived relationship that relates the UIP as a percent of the crude protein (CP) to an end product temperature in a predictable and repeatable manner to produce said end product,
  wherein the empirically derived relationship that relates the UIP as a percent of the crude protein (CP) is adjusted according to the following formula:

$$UIP (\% \text{ of } CP) = (\text{End Product Temperature } ° F. \times 0.819) - 107.644.$$

22. The method of claim 21, wherein the bypass protein (RUP/UIP) level of the end product that is over 50% and up to about 83% of the crude protein is adjusted and is increased in a range from approximately one and one-fourth times to approximately two and one-half times the bypass protein (RUP/UIP) level in the starting by-product-nutrient-source mixture.

23. The end product made by the process of claim 21.

24. The end product made by the process of claim 22.

25. A system for predictably enhancing the nutrient value of distillers, brewers or fermenters grain byproducts, and for producing a protein feed or feed supplement end product having a crude protein content of over 30% of the feed or feed supplement end product composition on a dry matter basis, and at least one of (1) a UIP/RUP content of over 50% and up to about 83% of the crude protein, (2) amino acid levels in the crude protein and in the RUP/UIP of greater than 1% and up to about 2% methionine and 2% and up to about 8% lysine, or (3) having a post ruminal digestibility of the UIP/RUP of over 60% and up to about 94%, comprising:
  system mixing apparatus for mixing a distillers, brewers or fermenters grain by-product-nutrient source mixture having an enhanced nutrient value by adding one or more crude protein and/or amino acid content nutrient sources comprising canola meal, soybean meal, or sunflower meal into wet distillers, fermenters or brewers byproducts based on the crude protein, UIP protein, amino acid content, UIP/RUP amino acid content of the added nutrient sources; and
  system adjusting apparatus for adjusting the temperature and/or the moisture content of the enhanced nutrient value by-product-nutrient source mixture based on an empirically derived relationship that relates the UIP as a percent of the crude protein (CP) to an end product temperature in a predictable and repeatable manner to produce said end product,
  wherein the empirically derived relationship that relates the UIP as a percent of the crude protein (CP) is adjusted according to the following formula:

$$UIP (\% \text{ of } CP) = (\text{End Product Temperature } ° F. \times 0.819) - 107.644.$$

26. The system of claim 25, wherein the bypass protein (RUP/UIP) level of the end product is increased to between one and one-fourth times and approximately two and one-half times the original level of the byproduct-nutrient-source mixture, wherein the RUP/UIP in the end product is about 50% and up to about 83% of the crude protein levels.

27. The system of claim 25, wherein the system adjusting apparatus is provided for providing the temperature in a range that causes denaturation of the protein of the by-product nutrient source mixture.

28. A method of predictably enhancing the nutrient value of distillers, brewers or fermenters grain solubles, and of producing a protein feed or feed supplement end product having a crude protein content of over 30% on a dry matter basis of the feed or feed supplement end product composition, and at least one of (1) a UIP/RUP content of over 50% and up to about 83% of the crude protein, (2) amino acid levels in the crude protein and in the RUP/UIP of greater than 1% and up to about 2% methionine and 2% and up to about 8% lysine, or (3) having a post ruminal digestibility of the UIP/RUP of over 60% and up to about 94%, comprising:

determining the desirable levels of crude protein, UIP/RUP, amino acids and post ruminal digestibility in an end product;

creating a distillers, brewers or fermenters grain by-product solubles-nutrient source mixture having an enhanced nutrient value by (a) adding one or more crude protein and/or amino acid content nutrient sources comprising canola meal, soybean meal, sunflower meal into wet distillers, brewers or fermenters solubles based on the crude protein, UIP protein, amino acid content, UIP/RUP amino acid content of the added nutrient sources; and (b) adjusting the temperature and/or the moisture content of the enhanced nutrient value solubles-nutrient source mixture based on an empirically derived relationship that relates the UIP as a percent of the crude protein (CP) to an end product temperature in a predictable and repeatable manner to produce said end product,     wherein the empirically derived relationship that relates the UIP as a percent of the crude protein (CP) is adjusted according to the following formula:

$$UIP(\% \text{ of } CP) = (\text{End Product Temperature } °F. \times 0.819) - 107.644.$$

29. The end product made by the process of claim 28.

30. A method of predictably enhancing the nutrient value of distillers, brewers or fermenters grain solubles, and of producing a protein feed or feed supplement end product having a crude protein content of over 30% on a dry matter basis of the feed or feed supplement end product composition, and at least two of (1) a UIP/RUP content of over 50% and up to about 83% of the crude protein, (2) amino acid levels in the crude protein and in the RUP/UIP of greater than 1% and up to about 2% methionine and 2% and up to about 8% lysine, or (3) having a post ruminal digestibility of the UIP/RUP of over 60% and up to about 94%, comprising:

determining the desirable levels of crude protein, UIP/RUP, amino acids and post ruminal digestibility in an end product;

creating a distillers, brewers or fermenters grain by-product solubles-nutrient source mixture having an enhanced nutrient value by (a) adding one or more crude protein and/or amino acid content nutrient sources comprising canola meal, soybean meal, sunflower meal into wet distillers, brewers or fermenters solubles based on the crude protein, UIP protein, amino acid content, UIP/RUP amino acid content of the added nutrient sources; and (b) adjusting the temperature and/or the moisture content of the enhanced nutrient value solubles-nutrient source mixture based on an empirically derived relationship that relates the UIP as a percent of the crude protein (CP) to an end product temperature in a predictable and repeatable manner to produce said end product,     wherein the empirically derived relationship that relates the UIP as a percent of the crude protein (CP) is adjusted according to the following formula:

$$UIP(\% \text{ of } CP) = (\text{End Product Temperature } °F. \times 0.819) - 107.644.$$

31. A method of predictably enhancing the nutrient value of distillers, brewers or fermenters grain solubles, and of producing a protein feed or feed supplement end product having a crude protein content of over 30% on a dry matter basis of the feed or feed supplement end product composition, and (1) a UIP/RUP content of over 50% and up to about 83% of the crude protein, (2) amino acid levels in the crude protein and in the RUP/UIP of greater than 1% and up to about 2% methionine and 2% and up to about 8% lysine, and (3) having a post ruminal digestibility of the UIP/RUP of over 60% and up to about 94%, comprising:

determining the desirable levels of crude protein, UIP/RUP, amino acids and post ruminal digestibility in an end product;

creating a distillers, brewers or fermenters grain by-product solubles-nutrient source mixture having an enhanced nutrient value by (a) adding one or more crude protein and/or amino acid content nutrient sources comprising canola meal, soybean meal, sunflower meal into wet distillers, brewers or fermenters solubles based on the crude protein, UIP protein, amino acid content, UIP/RUP amino acid content of the added nutrient sources; and (b) adjusting the temperature and/or the moisture content of the enhanced nutrient value solubles-nutrient source mixture based on an empirically derived relationship that relates the UIP as a percent of the crude protein (CP) to an end product temperature in a predictable and repeatable manner to produce said end product;

wherein the empirically derived relationship that relates the UIP as a percent of the crude protein (CP) is adjusted according to the following formula:

$$UIP(\% \text{ of } CP) = (\text{End Product Temperature } °F. \times 0.819) - 107.644.$$

32. The method of claim 31, wherein the bypass protein (RUP/UIP) level of the end product that is over 50% and up to about 83% of the crude protein is increased approximately 2.44 times the bypass protein (RUP/UIP) level in the wet distillers, brewers, or fermenters grains before the crude protein, and/or amino acid content nutrient sources are added.

33. The end product made by the process of claim 30.

34. The end product made by the process of claim 31.

35. A system for predictably enhancing the nutrient value of distillers, brewers or fermenters solubles, and for producing a protein feed or feed supplement end product for having a crude protein content of over 30% on a dry matter basis of the feed or feed supplement end product composition, and at least one of (1) a UIP/RUP content of over 50% and up to about 83% of the crude protein, (2) amino acid levels in the crude protein and in the RUP/UIP of greater than 1% and up to about 2% methionine and 2% and up to about 8% lysine, or (3) having a post ruminal digestibility of the UIP/RUP of over 60%, and up to about 94% comprising:

system mixing apparatus for mixing a distillers, brewers or fermenters grain by-product solubles-nutrient source mixture having an enhanced nutrient value by adding one or more crude protein and/or amino acid content nutrient sources comprising canola meal, soybean meal, or sunflower meal into wet distillers, brewers or fermenters solubles based on the crude protein, UIP protein, amino acid content, UIP/RUP amino acid content of the added nutrient sources; and     system adjusting apparatus for adjusting the temperature and/or the moisture content of the enhanced nutrient value solubles-nutrient source mixture based on an empirically derived relationship that relates the UIP as a percent of the crude protein (CP) to an end product temperature in a predictable and repeatable manner is provided for producing said end product, wherein the empirically derived relationship that relates the UIP as a percent of the crude protein (CP) is adjusted according to the following formula:

$$UIP (\% \text{ of } CP) = (\text{End Product Temperature } °F. \times 0.819) - 107.644.$$

36. A system for predictably enhancing the nutrient value of distillers, brewers or fermenters solubles, and for producing a protein feed or feed supplement end product for having a crude protein content of over 30% on a dry matter basis of the feed or feed supplement end product composition, and at least two of (1) a UIP/RUP content of over 50% and up to about 83% of the crude protein, (2) amino acid levels in the crude protein and in the RUP/UIP of greater than 1% and up to about 2% methionine and 2% and up to about 8% lysine, or (3) having a post ruminal digestibility of the UIP/RUP of over 60% and up to about 94%, comprising:

system mixing apparatus for mixing a distillers, brewers or fermenters grain by-product solubles-nutrient source mixture having an enhanced nutrient value by adding one or more crude protein and/or amino acid content nutrient sources comprising canola meal, soybean meal, or sunflower meal into wet distillers, brewers or fermenters solubles based on the crude protein, UIP protein, amino acid content, UIP/RUP amino acid content of the added nutrient sources to create an enhanced nutrient value by-product-nutrient source mixture of the distillation or fermentation byproducts; and system adjusting apparatus for adjusting the temperature and/or the moisture content of the enhanced nutrient value solubles-nutrient source mixture based on an empirically derived relationship that relates the UIP as a percent of the crude protein (CP) to an end product temperature in a predictable and repeatable manner is provided for producing said end product, wherein the empirically derived relationship that relates the UIP as a percent of the crude protein (CP) is adjusted according to the following formula:

$$UIP (\% \text{ of } CP) = (\text{End Product Temperature } °F. \times 0.819) - 107.644.$$

37. A system for predictably enhancing the nutrient value of distillers, brewers or fermenters solubles, and for producing a protein feed or feed supplement end product having a crude protein content of over 30% on a dry matter basis of the feed or feed supplement end product composition, and a UIP/RUP content of over 50% and up to about 83% of the crude protein, amino acid levels in the crude protein and in the RUP/UIP of greater than 1% and up to about 2% methionine and 2% and up to about 8% lysine, and having a post ruminal digestibility of the UIP/RUP of over 60% and up to about 94%, comprising:

system mixing apparatus for mixing a distillers, brewers or fermenters grain by-product solubles-nutrient source mixture having an enhanced nutrient value by adding one or more crude protein and/or amino acid content nutrient sources comprising canola meal, soybean meal, or sunflower meal into wet distillers, brewers or fermenters solubles based on the crude protein, UIP protein, amino acid content, UIP/RUP amino acid content of the added nutrient sources; and system adjusting apparatus for adjusting temperature and/or the moisture content of the enhanced nutrient value solubles-nutrient source mixture based on an empirically derived relationship that relates the UIP as a percent of the crude protein (CP) to an end product temperature in a predictable and repeatable manner is provided for producing said end product, wherein the empirically derived relationship that relates the UIP as a percent of the crude protein (CP) is adjusted according to the following formula:

$$UIP (\% \text{ of } CP) = (\text{End Product Temperature } °F. \times 0.819) - 107.644.$$

38. The system of claim 35, wherein by adjusting temperature and/or moisture content the system adjusting apparatus for providing a bypass protein (RUP/UIP) level of the end product that is over 50% and up to 83% of the crude protein increases the bypass protein (RUP/UIP) level to approximately 2.44 times the bypass protein (RUP/UIP) level in the wet distillers, brewers, or fermenters grain by-product solubles before the crude protein, and/or amino acid content nutrient sources are added.

* * * * *